United States Patent [19]

Girard

[11] 4,083,076
[45] Apr. 11, 1978

[54] PIPELINE PIG WITH LONGITUDINALLY INCOMPRESSIBLE MEMBER

[76] Inventor: Harry J. Girard, P.O. Box 27208, Houston, Tex. 77027

[21] Appl. No.: 759,262

[22] Filed: Jan. 14, 1977

[51] Int. Cl.² .............................................. B08B 9/04
[52] U.S. Cl. ............................. 15/104.06 R; 137/268
[58] Field of Search ............. 15/104.06 R, 104.06 A, 15/104.06 B, 3.5, 3.51; 166/192, 193; 134/8; 137/268

[56] References Cited

U.S. PATENT DOCUMENTS

| | | | |
|---|---|---|---|
| 1,218,005 | 3/1917 | Schlemmer | 15/104.06 R |
| 2,188,959 | 2/1940 | Schaer | 15/104.06 R |
| 2,244,076 | 6/1941 | Moe | 166/192 |
| 3,266,076 | 8/1966 | Surber | 15/104.06 A |
| 3,538,531 | 11/1970 | Knapp et al. | 15/104.06 R |
| 3,725,968 | 4/1973 | Knapp et al. | 15/104.06 R |
| 3,875,606 | 4/1975 | Landers | 15/104.06 R |

Primary Examiner—Edward L. Roberts

[57] ABSTRACT

A pipeline pig of the type to be propelled through a pipeline by a pressure gradient in the line to clear accumulations and deposits of sludge, scale and other material from the walls of the pipe. The pig includes an elongated cylindrical foamed elastomer body member and a substantially incompressible column member, located generally co-axially within, and with ends extending beyond the ends of, the body member.

8 Claims, 3 Drawing Figures

PIPELINE PIG WITH LONGITUDINALLY INCOMPRESSIBLE MEMBER

BACKGROUND OF THE INVENTION a. Field of the Invention

This invention relates to a device for cleaning the interior surfaces of pipes, propelled therethrough by a pressure gradient therein.

b. Description of the Prior Art

In the operation of pipelines, it periodically becomes necessary to clean from the inner surfaces of the pipes accumulations and deposits of sludge, scale, debris, and other material. These cleaning operations are most commonly carried out by propelling through the pipe, by a pressure gradient therein, devices known in the art as pigs.

There are a variety of designs of pigs available, most of which consist generally of a mass of resilient material having a generally circular cross section with diameter slightly greater than that of the pipe through which they are to be propelled. These pigs are most commonly cylindrical in shape, such as those described in U.S. Pat. Nos. 3,543,323 and 3,277,508. Among other designs for pigs are spheres, described in U.S. Pat. No. 3,543,324, and devices with resilient material mounted upon a rigid central shaft, as described in U.S. Pat. Nos. 3,484,886 and 3,541,628. Cylindrical pigs generally have rounded or pointed forward ends, examples of which are described in U.S. Pat. Nos. 3,538,531 and 3,277,508. Having a rounded or pointed forward end enables the pig to pass obstructions more easily and to negotiate bends in the pipe. Additionally, some cylindrical pigs have a concave back end — examples of which are described in U.S. Pat. Nos. 3,538,531 and 3,602,934 — which transmits a radial component of the force thereon caused by fluid pressure to the walls of the pipe, effecting a tighter fit. Finally, most cylindrical pigs are covered with strips of material which is harder than the resilient material of which the pig body is made. Additionally, some strips are applied to the pig in a helical pattern, serving to impart spin to the pig, thereby equalizing the wear over the surface of the pig. Examples of various striping patterns are shown in U.S. Pat. Nos. 3,204,274, 3,605,159 and 3,389,417.

One system for introducing pigs into a pipeline is described in U.S. Pat. No. 3,266,076. A supply of pigs is inserted into a launching tube having essentially the same diameter as the pipeline and joined to the pipeline in such a way as to allow a smooth passage of the pig into the line. Spaced longitudinally along the launching tube is a series of ports, connected by valved conduits, to a high pressure fluid supply line. The pigs are inserted into the launching tube in such a manner that spaces are left between the pigs, such spaces coinciding with the port spacing. To launch a pig, the valve immediately upstream of the most downstream pig in the launching tube is opened, allowing high pressure fluid to flood the space between the most downstream pig and the next most downstream pig. The pressure of the fluid upon the upstream end of the pig to be launched, being greater than that upon the downstream end thereof, forces the pig to move downstream in the launching tube and into the pipeline.

Cylindrical pigs, as presently known in the art, are manifestly unsuited for use in the launching system described above. Since the operation of the system depends upon there being spaces between the pigs coinciding with the location of the ports, each pig must be rather precisely placed within the launching tube. To achieve such placement, personnel are required to ram each individual pig, independently of the other pigs, a specified distance into the launching tube.

In addition to the problem associated with achieving proper initial spacing, a more severe disadvantage lies in the fact that the injection of high pressure fluid into the launching tube accomplishes not only the desired result of forcing the most downstream pig into the pipeline, but also the undesired result of forcing the upstream pigs further upstream in the launching tube. The upstream pigs may be so dislodged in the launching tube as to occlude the ports, making the system inoperable.

SUMMARY OF THE INVENTION

It is, therefore, an object of this invention to provide an improved cylindrical pipeline pig that will automatically achieve proper spacing when inserted into a pig launching tube. It is a further object of this invention to provide an improved pipeline pig that will not become displaced in the pig-launching tube as other pigs are launched.

Briefly stated, the improved pipeline pig comprises an elongated cylindrical body member formed of a resilient material, preferably polyurethane foam. Bonded within, and coaxial with, the body member is an elongated column member which is substantially incompressible along the longitudinal axis thereof. The column member is of somewhat greater length than the body member and its ends extend beyond the ends of the body member. The column member is bonded within the body member so that the body member will not slide longitudinally along the column member. The invention may also include mechanical means for maintaining substantially constant the longitudinal position of the column member with respect to the body member.

The column member may be cylindrical in shape, or it may be flat sided. Further, the column may include disc shaped end portions of greater diameter than the column member, joined fixedly at, and generally coaxial with, the ends thereof.

The maintaining means may be in the form of one or more disc-shaped collars joined coaxially and immovably to the column member and within the body member.

DESCRIPTION OF THE PREFERRED EMBODIMENT

Figure 2:
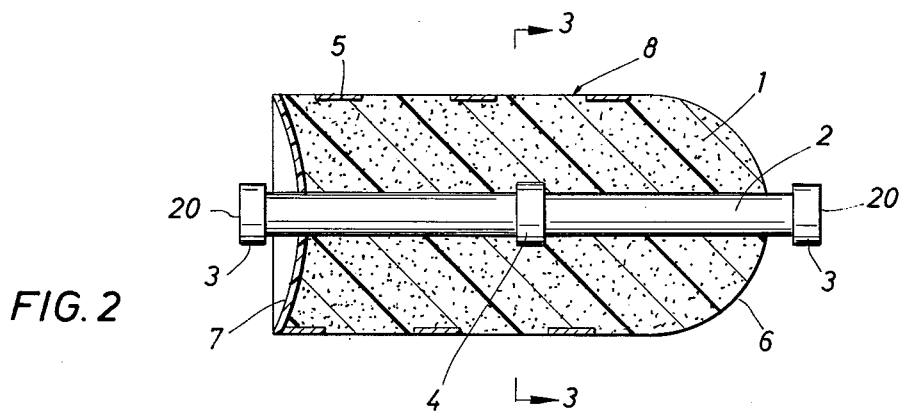
FIG. 2 is a partial cross sectional view of one preferred embodiment of the invention showing the relationship of the column member within the body member.
Figure 3:
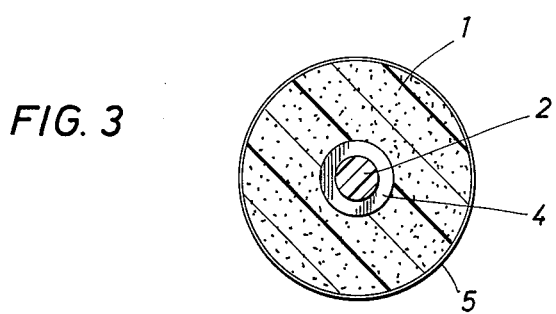
FIG. 3 is a cross sectional view taken along line 3—3 of FIG. 2 showing the relationship of the discshaped collar to the column member and body member.

Referring first to FIG. 2, the pipeline pig of the invention is designated generally by the numeral 8. Pig 8 is generally comprised of a body member 1 molded around a column member 2.

Column member 2 is constructed so as to resist compression or buckling under longitudinal force, but so as to be flexible in response to forces perpendicular to the longitudinal axis thereof, in order that pig 8 will pass obstructions, such as dents, in the pipe and negotiate moderate bends. Column member 2 is a molded solid cylinder of high durometer polyurethane. However, the form of column member 2 need not be limited to that of a solid cylinder, nor need the material of which column member 2 is made be limited to polyurethane. Column member 2 may be of virtually any cross sectional shape. Likewise, column member 2 may be hollow. If, however, column member 2 is hollow, the ends thereof must be sealed in order that fluid will not flow therethrough. Additionally, column member 2 may be constructed of any material which is resistent to longitudinal compression yet flexible. Examples of such materials are fiber glass and spring steel. The overall length of column member 2 with any end portions 3, to be described hereinafter, affixed thereto must be substantially equal to the distance between the ports 12 of the launching system 10, also described hereinafter, with which pig 8 is to be used.

Column member 2 has immovably joined thereto one or more disc-shaped collars 4. Collar 4 is molded as an integral unit with column 2. However, collar 4 may also be formed as a ring and slid onto column 2 and there fixed in place. A function of collar 4 is to keep column 2 from sliding longitudinally in relation to body 1. A related function is to transfer longitudinal forces between body 1 to column 2. Collar 4 is of substantially larger diameter than column 2 so that the longitudinal interface of collar 4 and body 1 is of large enough area to transmit forces between body 1 and collar 2 without causing damage to body 1.

Joined immovably to the ends of column 2 are disc-shaped end portions 3. As with collar 4, end portions 3 are molded as an integral unit with column 2. Similarly they may be formed as rings and slid into column 2 and there fixed in place. The face 20 of each end portion 3 is substantially perpendicular to the longitudinal axis of column 2 so that forces exerted on a face 20 will be transferred to column 2 substantially parallel to the longitudinal axis thereof. The diameter of each end plate 3 is substantially larger than that of column 2 in order to provide a greater area of contact between adjacent end plates 3 for the transmission of force to column 2.

Body 1 is a generally cylindrical mass of polurethane foam molded coaxial with and bonded to column member 2. Body 1 is somewhat shorter than column member 2 and must be positioned so that neither end thereof extends beyond the ends of column member 2. Further, body 1 must be so positioned on column member 2 that no part thereof occludes any port 12 in launching system 10, to be described hereinafter. The primary function of body 1 is contact the inner surface of the pipe and thereby accomplish the cleaning purpose of pig 8. A secondary function of body 1 is to support column 2, thereby making said column more resistent to buckling.

Body 1 may also incorporate features which are generally known in the art with respect to cylindrical pigs. For example, body 1 may be covered with helical strips 5 of material which will impart spin to, and increase the durability of, pig 8. Further, the back 7 of body 1 may be concave and of a flexible fluid impermiable material so as to transmit a radial component of the force thereon caused by fluid pressure to the walls of the pigs. Similarly, the nose 6 of body 1 may be convex so as to allow pig 8 to pass obstructions and bends in the pipe more easily.

Figure 1:
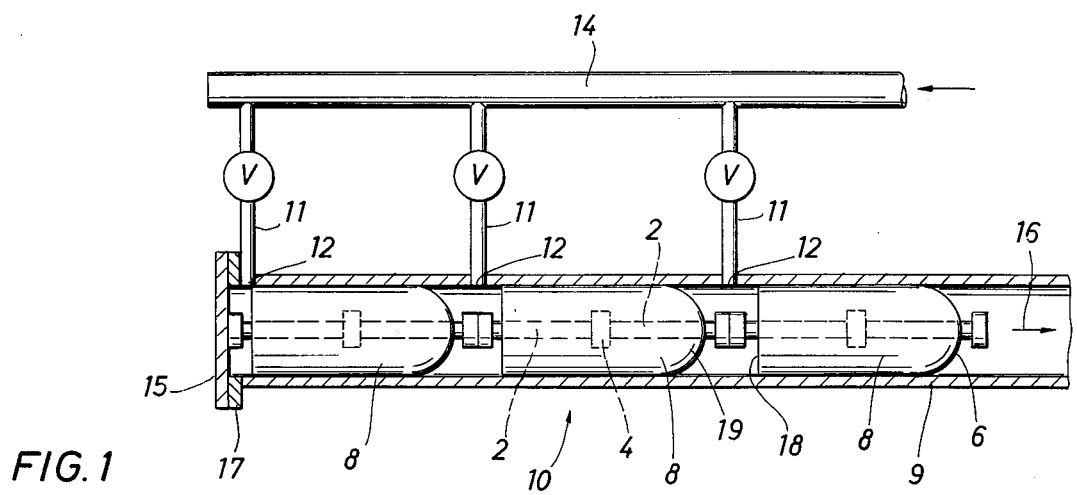
FIG. 1 is a partial cross sectional view showing three pigs of the preferred embodiment of this invention within a pig launching tube.

Referring now to FIG. 1, a portion of a typical pipeline pig launching system has been generally designated by the number 10. Launching system 10 is comprised generally of a launching tube 9, connected to the pipeline through a downstream valved opening (not shown) and closed by closure plate 15 at upstream end 17, a high pressure supply line 14, and a plurality of valved conduits 11 connecting high pressure supply line 14 to launching tube 9 at ports 12. Each conduit 11 is fitted with a launcher valve V to control fluid flow therethrough.

A plurality of pipeline pigs 8 (as many as there are ports 12) are inserted into launching tube 9 at upstream end 17. As each pig 8 is inserted into launching tube 9, each column member 2 thereof pushes against the column 2 of the next pig 8 in launching tube 9, causing the next pig 8 and any pigs 8 further downstream within launching tube 9 to advance. When the last of the pigs is inserted into launching tube 9, closure plate 15 is closed behind and abuts column member 2 of the most upstream one of pigs 8. Since column members 2 are of length essentially equal to the distance between ports 12, the loading operation automatically accomplishes proper spacing of said pigs.

To launch a pig 8, valve V in conduit 11 immediately upstream of the most downstream of pigs 8 is opened, allowing fluid to flow from high pressure supply line 14 into launching tube 9. The high pressure fluid exerts a force on the most downstream pig at back 18 thereof, and upon the next most downstream pig 8 at nose 19 thereof. The force exerted upon the most downstream pig 8, being greater at back 18 thereof than at nose 6 thereof, causes said pig to move downstream in the direction of arrow 16 and into the pipeline. The force exerted on nose 19 of the next most downstream pig is transferred to column member 2 thereof by the interaction of the material of body 1 of pig 8 with collar 4 thereof. The force is in turn transferred to closure plate 15 via column members 2 of the remaining upstream pigs 8.

Further modification and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be taken in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a pipeline pig of the type to be propelled through a pipeline by a pressure gradient, the combination comprising:
    an elongated one piece cylindrical body member formed of a resilient material;
    an elongated column member mounted within and generally coaxial with said body member and having at least one end extending beyond one end of said body member, wherein said end has a diameter smaller than that of said body member, said column member being substantially incompressible along the longitudinal axis thereof and flexible perpendicular to the longitudinal axis thereof.

and a radially enlarged portion joined coaxially and immovably to said column member, and within said body member.

2. The invention as claimed in claim 1 wherein:
said radially enlarged portion comprises a disc-shaped collar.

3. The invention as claimed in claim 1 wherein:
each end of said column member is provided with a flat sided, disc-shaped end portion generally coaxial therewith, and of greater diameter than said column member.

4. The invention as claimed in claim 1 wherein:
said body member is formed of polyurethane foam.

5. The invention as claimed in claim 1 wherein:
said column member is generally cylindrical in shape.

6. The invention as claimed in claim 1 wherein:
said column member is formed of non-foamed polyurethane.

7. The invention as claimed in claim 1 wherein:
both ends of said column member extend beyond the ends of said body member.

8. The invention as claimed in claim 1 wherein:
said body member is bonded to said column member.

UNITED STATES PATENT AND TRADEMARK OFFICE
CERTIFICATE OF CORRECTION

PATENT NO. : 4,083,076
DATED : April 11, 1978
INVENTOR(S) : Harry J. Girard

It is certified that error appears in the above-identified patent and that said Letters Patent are hereby corrected as shown below:

In column 3, line 38, the word "into" should be --onto--.

Signed and Sealed this

Eighth Day of August 1978

[SEAL]

Attest:

RUTH C. MASON
*Attesting Officer*

DONALD W. BANNER
*Commissioner of Patents and Trademarks*